United States Patent [19]

Rasshofer et al.

[11] Patent Number: 4,565,645
[45] Date of Patent: Jan. 21, 1986

[54] SINGLE-STAGE PROCESS FOR THE PRODUCTION OF POLYAMINES AND POLYAMINES PRODUCED BY SUCH PROCESS

[75] Inventors: Werner Rasshofer, Cologne; Dieter Dieterich, Leverkusen, both of Fed. Rep. of Germany

[73] Assignee: Bayer Aktiengesellschaft, Leverkusen, Fed. Rep. of Germany

[21] Appl. No.: 506,263

[22] Filed: Jun. 21, 1983

[30] Foreign Application Priority Data

Jun. 23, 1982 [DE] Fed. Rep. of Germany ....... 3223397

[51] Int. Cl.$^4$ ............ C09K 3/00; C08G 18/08; C08G 18/20; C08G 18/10
[52] U.S. Cl. ................... 252/182; 564/393; 564/414; 525/127; 525/131; 525/452; 528/53; 528/54; 528/57; 528/61; 528/64
[58] Field of Search ............ 525/127, 131, 452, 453, 525/454, 455; 528/53, 54, 57, 60, 65, 68, 499, 61, 64; 564/61, 511, 393, 414; 252/182

[56] References Cited

U.S. PATENT DOCUMENTS

| | | | |
|---|---|---|---|
| 2,888,439 | 5/1959 | Simons | 260/77.5 |
| 3,044,989 | 7/1962 | Shivers, Jr. | 260/77.5 |
| 3,184,502 | 5/1965 | Müller et al. | 260/482 |
| 3,385,829 | 5/1968 | Heydkamp et al. | 260/75 |
| 3,592,854 | 7/1971 | Potts et al. | 564/414 |
| 3,625,871 | 12/1971 | Traubel et al. | 260/2.5 AY |
| 3,808,250 | 4/1974 | Balahak et al. | 260/455 R |
| 3,865,791 | 2/1975 | Brinkmann et al. | 260/77.5 CH |
| 4,129,741 | 12/1978 | Schmidt et al. | 560/50 |
| 4,153,801 | 5/1979 | Schmidt et al. | 548/312 |
| 4,163,831 | 8/1979 | Gessell | 526/153 |
| 4,169,206 | 9/1979 | Mazanek et al. | 560/50 |
| 4,172,050 | 10/1979 | Gessell | 252/431 R |
| 4,180,644 | 12/1979 | Marquis et al. | 528/68 |
| 4,198,348 | 4/1980 | Bertini et al. | 564/414 |
| 4,224,417 | 9/1980 | Hajek et al. | 521/166 |
| 4,260,557 | 4/1981 | Mazanek et al. | 260/455 R |
| 4,260,729 | 4/1981 | Schmidt et al. | 528/68 |
| 4,386,218 | 5/1983 | Rasshofer et al. | 564/38 |

FOREIGN PATENT DOCUMENTS

| | | |
|---|---|---|
| 262970 | 10/1967 | Austria . |
| 1155907 | 10/1963 | Fed. Rep. of Germany . |
| 2447748 | 4/1975 | Fed. Rep. of Germany . |
| 2703313 | 8/1978 | Fed. Rep. of Germany . |
| 2948419 | 8/1981 | Fed. Rep. of Germany . |
| 920475 | 3/1963 | United Kingdom . |
| 1033912 | 6/1966 | United Kingdom . |
| 1117494 | 6/1968 | United Kingdom . |

OTHER PUBLICATIONS

H. John, J. Prakt. Chemie, 130, 314 et seq. 332 et seq. 1931.

Primary Examiner—John Kight
Assistant Examiner—Kriellion Morgan
Attorney, Agent, or Firm—Gene Harsh; Joseph C. Gil; Lyndann M. Whalen

[57] ABSTRACT

Polyamines containing from 0.19 to 20.3 wt % primary amino groups are produced by hydrolyzing in a single stage an isocyanate with an excess of water, a relatively weak basic compound and a water-miscible polar solvent at a temperature from 50° to 165° C. The hydrolysis is conducted in a manner such that the reactants are substantially homogeneous during the reaction. The isocyanate should have an NCO-content of from 0.5 to 40 wt %. The weakly basic compound may be a carbonate or hydrogen carbonate of an alkali metal or an alkali or alkaline earth salt of a monocarboxylic or polycarboxylic acid or mixtures of such materials. The polyamines produced by this process are particularly useful in the production of polyurethanes.

15 Claims, No Drawings

SINGLE-STAGE PROCESS FOR THE PRODUCTION OF POLYAMINES AND POLYAMINES PRODUCED BY SUCH PROCESS

BACKGROUND OF THE INVENTION

This invention relates to a simplified single-stage process for the production of polyamines containing primary amino groups by the hydrolysis of compounds containing isocyanate groups (NCO-content 0.5 to 40 wt. %) with water in the presence of a catalyst and a water-soluble solvent. The invention also relates to amines produced by this process.

It is known that aromatic isocyanates can be converted into primary aromatic amines by acid hydrolysis. However, because the amine formed during hydrolysis further reacts with unreacted isocyanate to form the corresponding urea, the yield of primary amine is less than desirable. This further reaction with isocyanate cannot be suppressed even by using excess strong mineral acid. A fairly recent example of such a procedure may be found in Japanese Patent No. 55 007-827.

DE-B No. 1,270,046 describes a process for the production of primary aromatic amines containing polyalkylene glycol ether segments. In this disclosed process, reaction products of aromatic diisocyanates or triisocyanates with polyalkylene glycol ethers and/or polyalkylene glycol thioethers (preferably those having molecular weights of from 400 to 4000) are further reacted with secondary or tertiary carbinols. The products are subsequently subjected to thermal decomposition at elevated temperatures in an inert solvent (optionally in the presence of acid catalysts). In addition to the high decomposition temperature, another disadvantage of this procedure is that inflammable, readily volatile alkenes which are explosive in admixture with air are formed during the thermal decomposition of the urethanes so that safety measures have to be taken.

DE-B No. 1,694,152 describes the production of prepolymers containing at least two terminal amino groups. In the disclosed process, hydrazine is reacted with aminophenyl ethylamine or other diamines and an NCO-prepolymer of a polyether polyol and polyisocyanate (NCO:NH ratio=1:1.5 to 1:5). Unreacted amine must be carefully removed in another step because it catalyzes the reaction with polyisocyanates to a considerable extent, thereby leading to short processing times.

Another possible method for synthesizing polyamines containing urethane groups is described in French Patent No. 1,415,317. NCO-prepolymers containing urethane groups are converted with formic acid into the N-formyl derivatives. These N-formyl derivatives are then hydrolyzed to form terminal aromatic amines. The reaction of NCO-prepolymers with sulfamic acid also leads to compounds containing terminal amino groups (DE-PS No. 1 155 907). Relatively high molecular weight prepolymers containing aliphatic secondary and primary amino groups are obtained according to DE-B No. 1,215,373 by reacting relatively high molecular weight hydroxyl compounds with ammonia under pressure at elevated temperature in the presence of catalysts. U.S. Pat. No. 3,044,989 teaches production of such prepolymers by reacting relatively high molecular weight polyhydroxyl compounds with acrylonitrile, followed by catalytic hydrogenation. Relatively high molecular weight compounds containing terminal amino groups and urethane groups may also be obtained by reacting NCO-prepolymers with enamines, aldimines or ketimines containing hydroxyl groups, followed by hydrolysis (DE-A No. 2,546,536 and U.S. Pat. No. 3,865,791). Another possible approach to synthesizing aromatic polyamines containing urethane and ether groups is opening the ring in the reaction of isatoic acid anhydride and diols. Polyamines of this type are described, for example, in U.S. Pat. No. 4,180,644 and in DE-A Nos. 2,019,432; 2,619,840; 2,648,774 and 2,648,825. The poor reactivity of aromatic ester amines obtained in this way is, however, a disadvantage in numerous applications.

The reaction of nitroaryl isocyanates with polyols, followed by reduction of the nitro groups to aromatic amino groups, is also known (U.S. Pat. No. 2,888,439). The main disadvantage of this process is the high cost of the reduction step.

It is also known that certain heteroaromatic isocyanic acid esters can be converted into heteroaromatic amines by basic hydrolysis. Unfortunately, the hydrolysis conditions described by H. John in J. Prakt. Chemie 130, 314 et seq and 332 et seq (1931) for two specific, heteroaromatic monoisocyanic acid esters are unsuitable for the conversion of poly-NCO-compounds into aliphatic and/or aromatic amines and they are also dangerous.

Two of our own proposals (DE-A Nos. 2,948,419.3 and 3,039,600.0) are directed to multistage processes for the production of polyamines. In our processes, NCO-preadducts are subjected to alkaline hydrolysis with excess base (alkali hydroxides) to form carbamates. These carbamates are then decomposed by acidification with mineral acids or ion exchanger resins in equivalent quantities or in quantities exceeding the quantity of base optionally followed by neutralization of excess quantities of acid with base and subsequent isolation of the polyamines.

These known processes for the production of polyamines are all somewhat complicated. It would therefore be desirable to have a technically simple process for the production of polyamines which is also economically more favorable. To this end, a single-stage process rather than the customary multistage processes would be particularly advantageous. It would also be advantageous to have a process in which virtually no salts are formed and no filtration step is required.

Until now, all attempts to obtain satisfactory yields of polyamines by the direct hydrolysis of polyisocyanates in a single stage have been unsuccessful. Instead of the desired hydrolysis products, the products obtained by known processes are not homogeneous nor are they free flowing and they contain urea groups with very few, if any, amino groups (cf. Comparison Examples). The reason for this may lie in the fact that the isocyanate/amine reaction is considerably faster than the isocyanate/water reaction. Consequently, the hydrolysis reaction catalyzed by alkali hydroxides has generally been carried out at the lowest possible temperatures and the alkali carbamates formed have been subsequently decomposed by heat treatment or by treatment with an acid.

SUMMARY OF THE INVENTION

It is an object of the present invention to provide a single-stage process for the production of a polyamine containing primary amino groups.

It is also an object of the present invention to provide a polyamine containing from 0.19 to 20.3 wt % $NH_2$-groups produced by a single-stage hydrolysis process.

It is another object of the present invention to provide a technically simple and economically desirable process for the production of a polyamine containing primary amino groups in good yield.

These and other objects which will be apparent to those skilled in the art are accomplished by hydrolyzing an isocyanate compound with excess water in the presence of a relatively weak basic compound and a water-miscible polar solvent at a temperature of from 50° to 165° C. The hydrolysis is conducted in a manner such that the reactants are substantially homogeneous during the reaction. The isocyanate compound employed should have an NCO-content of from 0.5 to 40 wt. %. Water should generally be used in a quantity such that at least two equivalents of water are present for each equivalent of NCO-groups. The relatively weak basic compound may be an alkali carbonate, an alkali hydrogen carbonate, an alkali or an alkaline earth salt of a monocarboxylic or polycarboxylic acid or mixtures of these materials and should generally be used in a quantity of from 1 to 200 g of catalyst for each equivalent of NCO-groups. The water-miscible polar solvent is typically used in a quantity of at least 10 parts by weight solvent for each 100 parts by weight isocyanate compound.

DETAILED DESCRIPTION OF THE INVENTION

It has now surprisingly been found that single-stage hydrolysis of polyisocyanates does lead directly to polyamines if the reaction is carried out in the presence of a relatively weakly basic compound (such as alkali carbonates, alkali hydrogen carbonates, or alkali carboxylates, e.g., potassium acetate) and in the presence of water-miscible solvents (such as dioxane, tetrahydrofuran, dimethyl formamide or acetonitrile). The hydrolysis reaction should be carried out at a temperature from 50° to 165° C. in order to suppress the formation of ureas. With the carbonates and other weakly basic compounds used in the process of the present invention, more urea groups are surprisingly formed at lower temperatures (for example at room temperature) than at the required high temperatures. It was not expected that the formation of ureas would be suppressed to such a significant extent under the conditions of the present invention because when alkali hydroxides were used as catalysts in the prior art discussed above, there was a marked increase in the formation of ureas at the elevated temperatures required in the present invention.

In the process of the present invention, water-miscible solvents are used to obtain a substantially homogeneous solution of the reactants (i.e., the NCO-compound and water, and the catalyst). A particularly suitable solvent is dimethylformamide.

It is known from German Auslegeschrift No. 1,235,499 that solutions of NCO-prepolymers in dimethyl formamide can be converted into highly viscous solutions which are suitable for spinning elasthane (spandex) filaments or for coatings with substantially equivalent quantities of water (80 to 120% of the theoretical) accompanied by chain extension through urea groups. The different reaction of the NCO-compounds with excess quantities of water to form almost exclusively low molecular weight amines was therefore surprising. In fact, it was quite unexpected that in the presence of the carbonate, hydrogen carbonate and carboxylic acid alkali salts of the present invention, such low molecular weight amines would be obtained because these carbonates and salts can act as isocyanate trimerization catalysts.

It is known that isocyanates react with dialkyl formamides to form formamidines (H. Ulrich et al, J. Org. Chem., 33, 3928–3930 (1968)). However, this reaction does not affect the smooth hydrolysis reaction by which the polyamines are formed in the process according to the present invention.

A significant advantage of the process of the present invention lies in the fact that where the catalysts required in the present invention are used, no salts are formed with the $CO_2$ eliminated (for example when alkali hydroxides are used), or any salt which does form is harmless because it also shows catalytic activity (for example in the formation of hydrogen carbonates). Thus, the catalysts may be re-used either in solution or after filtration. The catalysts may be removed from the reaction mixture or the polyamines by filtration. There is no need for complicated distillation processes. The only secondary product of the hydrolysis reaction is gaseous carbon dioxide.

The process of the present invention is particularly suitable for the hydrolysis of NCO-prepolymers based on polyesters because the mild reaction conditions do not result in any significant cleavage of the ester group during the hydrolysis reaction. The catalysts used in the present invention are commercially readily obtainable, inexpensive and may optionally be re-used after separation. These catalysts show less interaction with alkali-hydrolyzable solvents (such as dimethyl formamide) than strongly basic alkali hydroxides. Dimethyl formamide, for example, undergoes distinct hydrolysis when a strongly basic alkali hydroxide is used.

Accordingly, the present invention relates to a single-stage process for the production of polyamines containing primary amino groups by the hydrolysis of compounds containing NCO-groups in aqueous alkali media. In this process, (a) compounds containing NCO-groups, preferably aromatically bound NCO-groups (NCO-content 0.5 to 40 wt %, preferably 1.2 to 25 wt % and, most preferably, 1.5 to 15 wt %) are hydrolyzed with (b) excess quantities of water, i.e. quantities such that at least 2 equivalents and preferably more than 10 equivalents of water are present for each equivalent of NCO-groups in (a), in the presence of (c) a catalyst selected from alkali carbonate(s) and/or hydrogen carbonate(s), alkali and alkaline-earth metal salt(s) of mono- and/or polycarboxylic acid(s) and in the presence of (d) water-miscible polar solvent(s) at a temperature in the range from 50° to 165° C. and preferably at a temperature of from 80° to 130° C. with the reaction mixture being kept substantially homogeneous during the reaction. The water-miscible polar solvent preferably contains carboxylic acid dialkyl amide, lactam, tetraalkyl urea, sulfone, sulfoxide, phosphoric acid dialkyl amide, nitrile, ketone or ether groups, more preferably carboxylic acid dialkyl amide, ether and nitrile groups. This solvent is generally used in a quantity of $\geq 10$, preferably $\geq 20$ parts by weight and, most preferably, $\geq 40$ parts by weight of solvent for each 100 parts by weight of isocyanate compound. The catalyst is generally used in a quantity of 0.01 to 25 wt % per isocyanate compound, preferably of from 1 to 200 g, more preferably from 2 to 50 g, and most preferably from 5 to 30 g of catalyst for each equivalent of NCO-groups.

In the process of the present invention, it is particularly preferred to use at least 40 parts of water, catalyst and solvent to 60 parts of isocyanate compound and to maintain a homogeneous reaction phase in the mixture of isocyanate, water and solvent at the reaction temperatures selected. The catalyst is also preferably dissolved homogeneously in the reaction phase, although it may be only partly dissolved (as can be seen from the Examples).

In the process of the present invention small quantities, (i.e., between 0.1 and 5 wt %) of a compound containing one, two or more hydroxy and/or amino and/or thiol groups attached to aliphatic, cycloaliphatic or aromatic radicals may also be used. The use of these compounds containing "H-active groups" is advantageous in that polyamines substantially free from monomeric polyamine can be produced from NCO-compounds containing low molecular weight polyisocyanates (for example NCO-semiprepolymers) without treating the NCO-compounds by thin-layer distillation or similar processes. It is thus possible to produce modified polyamines (in an associated reaction step) which polyamines contain in one molecule polyamine segments, optionally of different types, attached through urethane groups, thiourethane groups or urea groups. By using a trifunctional or higher compound containing "H-active groups" in the NCO-hydrolysis reaction, it is thus possible to obtain a trifunctional or higher polyamine from, for example, a difunctional NCO-compound.

The present invention also relates to polyamines containing from 0.19 to 20.3 wt %, preferably from 0.46 to 11.3 wt % and most preferably, from 0.58 to 6.7 wt % of primary amino groups obtained by the above-described process. Polyamines containing aromatically bound primary amino groups of NCO-compounds containing aromatically bound NCO-groups are preferred; polyamines of NCO-compounds based on tolylene diisocyanates are particularly preferred.

The present invention also relates to the use of the polyamines obtained by the process of the present invention for the production of polyurethanes, optionally cellular polyurethane plastics and polyurethane foams. These polyurethanes are produced by reacting polyisocyanates and/or blocked polyisocyanates (including NCO-prepolymers) with the polyamines of the present invention and, optionally, other low molecular weight and/or relatively high molecular weight compounds containing isocyanate-reactive groups, optionally in the presence of auxiliaries and additives and/or solvents.

The NCO-compounds containing two or more aromatic, heterocyclic and/or aliphatic (preferably aromatic) NCO-groups suitable for use in the process of the present invention (hereinafter referred to as "NCO-compounds"), are (1) modified polyisocyanates of the type formed by the partial conversion of the isocyanate groups into urethane, urea, biuret, uret dione, isocyanurate and/or uretone imine groups or (2) so-called NCO-prepolymers of polyfunctional compounds containing NCO-reactive H-groups and having a molecular weight in the range from 62 to 12,000 and preferably from 400 to 6000 and (excess) quantities of aromatic polyisocyanates, or (3) semiprepolymers of NCO-prepolymers and additional low molecular weight polyisocyanates.

Suitable modified aromatic polyisocyanates include: polyisocyanates containing urethane groups (formed by modification with low molecular weight polyols); polyisocyanates containing urea groups (watermodified, German Pat. No. 1,230,778); polyisocyanates containing biuret groups (U.S. Pat. Nos. 3,124,605 and 3,201,372 and British Pat. No. 889,050); polyisocyanates containing isocyanurate groups (German Pat. Nos. 1,022,789 and 1,222,067) and dimeric or oligomeric polyisocyanates containing uret dione or uretone imine groups. Several uret dione polyisocyanates are described in Analytical Chemistry of the Polyurethanes, Vol. 16/III, High-Polymers-Series (Wiley 1969).

Modified polyisocyanates containing urethane and/or urea and/or biuret and/or uret dione and/or isocyanurate and/or uretone imine groups suitable for use in the process of the present invention typically have an NCO-content of from 5 to 40 wt % and preferably from 10 to 25 wt %.

The NCO-prepolymers useful as the isocyanate compound of the present invention may be obtained in known manner by reacting low molecular weight and/or relatively high molecular weight hydroxy and/or amino and/or thiol groups as compounds containing reactive groups (molecular weight 62 to approximately 12,000) with an excess of polyisocyanate.

Polyisocyanates suitable for use in the production of the compounds containing free NCO-groups are, in principle, any aromatic, aliphatic or heterocyclic polyisocyanates of the type described, for example, by W. Siefken in Justus Liebigs Annalen der Chemie, 562, pages 75 to 136. Appropriate polyisocyanates include those corresponding to the formula $Q(NCO)_n$, in which $n=2$ to 4 (preferably 2) and Q represents a hydrocarbon radical containing from 4 to 15 carbon atoms, an aromatic hydrocarbon radical containing from 6 to 15 and preferably from 6 to 13 carbon atoms, for example 1,3- and 1,4-phenylene diisocyanate, 2,4- and 2,6-tolylene diisocyanate and mixtures of these isomers, diphenyl methane-2,4'- and/or -4,4'- and/or -2,2'-diisocyanates, including the alkyl- and chlorine-substituted derivatives, and naphthylene-1,5-diisocyanate. Other suitable diisocyanates are the 2,4'-diisocyanatodiphenyl sulfides described in DE-A No. 2,922,966 and the alkyl-substituted diphenyl methane diisocyanates described for example in EP No. 24,665 and DE-A No. 2,935,318. Aliphatic and/or cycloaliphatic polyisocyanates, such as 1,6-hexane diisocyanate, lysine methyl ester diisocyanate, isophorone diisocyanate, the isomers of dicyclohexyl methane diisocyanate or biuret-containing or isocyanurate-containing trifunctional polyisocyanates based on hexane-1,6-diisocyanate or isophorone diisocyanate, may also be used.

Other suitable polyisocyanates are triphenyl methane-4,4',4"-triisocyanate; polyphenyl polymethylene polyisocyanates of the type obtained by condensing aniline with formaldehyde, followed by phosgenation (described for example in British Pat. Nos. 874,430 and 848,671); m- and p-isocyanatophenyl sulfonyl isocyanates (according to U.S. Pat. No. 3,454,606); perchlorinated aryl polyisocyanates (described, for example, in German Auslegeschrift No. 1,157,601 (U.S. Pat. No. 3,277,138)); polyisocyanates containing isocyanurate groups (described, for example, in U.S. Pat. No. 3,001,973, and in German Pat. Nos. 1,022,789; 1,222,067; 1,027,394; 1,929,034 and 2,004,048); polyisocyanates containing urethane groups (described, for example, in Belgian Pat. No. 752,261 or in U.S. Pat. Nos. 3,394,164 and 3,644,457); polyisocyanates containing acylated urea groups (according to German Pat. No. 1,230,778) and polyisocyanates produced by telomerization reactions (described, for example, in U.S.

Pat. No. 3,654,196). It is also possible to use diaryl alkylene diisocyanates obtained by the polymerization of acrylonitrile and, optionally, other ethylenically unsaturated monomers in the diaryl alkylene diisocyanates using the method according to European Patent Application No. 37,112 (U.S. Pat. No. 4,283,500).

In general, it is preferred to use the commercially readily available polyisocyanates, for example 2,4- and 2,6-tolylene diisocyanate, and mixtures of these isomers ("TDI"), polyphenyl polymethylene polyisocyanates of the type produced by condensing aniline with formaldehyde, followed by phosgenation ("crude MDI"), and polyisocyanates containing urethane groups, isocyanurate groups or urea groups ("modified polyisocyanates") in the production of NCO-prepolymers to be used as the starting material in the process of the present invention. The modified polyisocyanates derived from 2,4- and 2,6-tolylene diisocyanate (TDI) and from 4,4'- and/or 2,4'- and/or 2,2'-diphenyl methane diisocyanate (MDI) are particularly preferred. From the technical point of view, use of TDI and MDI (or their isomer mixtures) for production of the NCO-prepolymers is of greatest importance.

Compounds containing isocyanate-reactive groups which are preferably used in the production of the NCO-prepolymers are relatively high molecular weight compounds having a molecular weight in the range from 400 to 12,000 and, more preferably, in the range from 400 to 6000 and containing at least 1.9, preferably from 2 to 4 and, most preferably, from 2 to 3 hydroxyl, amino and/or thiol groups (preferably hydroxyl groups) per mole. Suitable compounds of this type include the polyacetals, polythioethers, polycarbonates, polyamides, polysiloxanes and/or polybutadienes containing isocyanate-reactive groups, particularly polyesters, polylactones and polyethers, and most preferably, polyethers containing hydroxyl groups, which are known and commonly used in polyurethane chemistry.

The polyethers containing at least two, generally two to eight and preferably two to three hydroxyl groups which are preferably used in making the NCO-prepolymers useful in the present invention are known. Such polyethers may be obtained, for example, by polymerizing epoxides, such as ethylene oxide, propylene oxide, butylene oxide, tetrahydrofuran, styrene oxide or epichlorohydrin themselves in the presence of Lewis catalysts (such as $BF_3$). They may also be made by the addition of epoxides (preferably ethylene oxide and propylene oxide) optionally in admixture or successively, with starter components containing reactive hydrogen atoms, such as water, ammonia, alcohols (for example ethylene glycol, 1,3- or 1,2-propane diol, trimethylol propane, glycerol, sorbitol, 4,4'-dihydroxy diphenyl propane) or amines (e.g., aniline, ethanolamine or ethylene diamine). Sucrose polyethers and also formitol-started or formose-started polyethers may also be used in accordance with the present invention. In many cases, it is preferred to use polyethers of the type which contain predominantly primary OH-groups (i.e., up to 90 wt %, based on all the OH-groups present in the polyether).

Polybutadienes containing OH-, NH- and/or SH-groups are also suitable for the production of NCO-prepolymers useful as starting materials in the process of the present invention (see Progress Org. Coatings, Vol. 7 (3), 289–329 (1979)).

Suitable polyacetals are, for example, the compounds obtainable from glycols, such as diethylene or triethylene glycol, 4,4'-dihydroxy ethoxy diphenyl methane, hexane diol and formaldehyde or compounds obtainable by the polymerization of cyclic acetals, such as trioxane.

Suitable polycarbonates containing hydroxyl groups are known to those skilled in the art and can be obtained, for example, by reacting diols, such as 1,3-propane diol, 1,4-butane diol and/or 1,6-hexane diol, di-, tri- or tetra-ethylene glycol or thiodiglycol, with diaryl carbonates (e.g., diphenyl carbonate) or phosgene (DE-B Nos. 1,694,080; 1,915,908 and 2,221,751; DE-A No. 2,605,024).

Preferred polyesters of dicarboxylic acids and diols are those of adipic acid and isophthalic acid (less preferred than adipic acid) and straight-chain and/or branched diols, as well as lactone polyesters, preferably based on caprolactone and starter diols.

Among the appropriate polythioethers, the condensation products of thiodiglycol on its own and/or with other glycols are particularly useful.

Polyhydroxyl compounds which already contain urethane or urea groups and optionally modified natural polyols may also be used in making NCO-prepolymers. Addition products of alkylene oxides with phenolformaldehyde resins or with urea-formaldehyde resins may also be used in accordance with the present invention. It is also possible to introduce amide groups into the polyhydroxyl compounds as taught in DE-A No. 2,559,372.

In accordance with the present invention, it is also possible to use polyhydroxyl compounds containing high molecular weight polyadducts and polycondensates or polymers in finely disperse or dissolved form. Polyhydroxyl compounds such as these may be obtained, for example, by polyaddition reactions (for example reactions between polyisocyanates and amino-functional compounds) and polycondensation reactions (for example between formaldehyde and phenols and/or amines) in situ in the above-mentioned compounds containing hydroxyl groups. Processes such as these are described in DE-B Nos. 1,168,075 and 1,260,142 and in DE-A Nos. 2,324,134; 2,423,984; 2,512,385; 2,513,815; 2,550,796; 2,550,797; 2,550,833; 2,550,862; 2,633,293 and 2,639,254. However, in accordance with U.S. Pat. No. 3,869,413 or DE-A No. 2,550,860 an aqueous polymer dispersion may be mixed with a polyhydroxyl compound and the water subsequently removed from the mixture.

Polyhydroxyl compounds modified by vinyl polymers obtained by polymerizing styrene and acrylonitrile in the presence of polyethers (U.S. Pat. Nos. 3,383,351; 3,304,273; 3,523,093 and 3,110,695; DE-B No. 1,152,536) or polycarbonate polyols (German Pat. No. 1,769,795; U.S. Pat. No. 3,637,909) are also suitable for use in the process of the present invention.

Representatives of the above-mentioned isocyanate-reactive group containing compounds which may be used in the present invention are described, for example, in High Polymers, Vol. XVI, "Polyurethanes, Chemistry and Technology" by Saunders-Frisch, Interscience Publishers, New York/London, Vol. I, 1962, pages 32–42 and pages 44–54 and Vol. II, 1964, pages 5–6 and 198–199, and in Kunststoff-Handbuch, Vol. VII, Vieweg-Hochtlen, Carl-Hanser-Verlag, Munich, 1966, for example on pages 45–71. It is also possible to use mixtures of the above-mentioned compounds containing at least two isocyanate-reactive hydrogen atoms and having a molecular weight of from 400 to 12,000 (for example mixtures of different polyethers).

Other starting components which may optionally be used in the production of the NCO-prepolymers used in the process of the present invention are compounds containing at least two isocyanate-reactive hydrogen atoms and having a molecular weight in the range from 18 to 399 (preferably from 62 to 399). These compounds may contain water and/or hydroxyl groups and/or amino groups and/or thiol groups (preferably hydroxyl groups) and are commonly used as chain-extending or crosslinking agents in polyurethane chemistry. These compounds generally contain from 2 to 8 and preferably from 2 to 4 isocyanate-reactive hydrogen atoms. Mixtures of such compounds may also be used.

Specific examples of these optional low molecular weight isocyanate-reactive compounds are water; ethylene glycol; 1,2- and 1,3-propane diol; 1,4- and 2,3-butane diol; 1,5-pentane diol; 1,6-hexane diol; 1,8-octane diol; neopentyl glycol; 1,4-bishydroxymethyl cyclohexane; 2-methyl-1,3-propane diol; dibromobutene diol; glycerol; trimethylol propane; 1,2,6-hexane triol; trimethylol ethane; pentaerythritol; quinitol; mannitol; sorbitol; dianhydrosorbitol; dianhydromannitol; castor oil; di-, tri- and tetraethylene glycol; di-, tri- and tetrapropylene glycol; dibutylene glycol and higher polyethylene, polypropylene or polybutylene glycols (having a molecular weight of up to 399); 4,4'-dihydroxy diphenyl propane; dihydroxy ethyl hydroquinone; ethanolamine; diethanolamine; N-methyl diethanolamine; triethanolamine and 3-aminopropanol.

Other low molecular weight polyols suitable for the purposes of the invention are the mixtures of hydroxy aldehydes and hydroxy ketones ("formose") and the polyhydric alcohols obtained therefrom by reduction ("formitol") which are formed in the autocondensation of formaldehyde hydrate (DE-A Nos. 2,639,084 and 2,714,084).

Aliphatic diamines suitable for use in making NCO-prepolymers for the process of the present invention include: ethylene diamine, 1,4-tetramethylene diamine, 1,6-hexamethylene diamine, 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenyl methane; p-xylylene diamine; bis-(3-aminopropyl)-methylamine; diaminoperhydroanthracenes and cycloaliphatic triamines (DE-A No. 2,614,244). Hydrazine and substituted hydrazines (for example methyl hydrazine) or dihydrazide compounds, may also be used.

Examples of appropriate aromatic diamines are diamines containing ether groups (DE-A Nos. 1,770,525 and 1,809,172 (U.S. Pat. Nos. 3,654,364 and 3,736,295)); 2-halogen-1,3-phenylene diamines optionally substituted in the 5-position (DE-A Nos. 2,001,772; 2,025,896 and 2,065,869); 3,3'-dichloro-4,4'-diaminodiphenyl methane; tolylene diamine; 4,4'-diaminodiphenyl methane; 4,4'-diaminodiphenyl disulfides (DE-A No. 2,404,976); diaminodiphenyl dithioethers (DE-A No. 2,509,404); aromatic diamines substituted by alkylthio groups (DE-A No. 2,638,760); aromatic diamines containing sulfonate or carboxylate groups (DE-A No. 2,720,166) and the high-melting diamines (DE-A No. 2,635,400). Examples of aliphatic-aromatic diamines are the aminoalkyl thioanilines described in DE-A No. 2,734,574.

Other compounds which may be used, although less preferred, in the production of the NCO-compounds used in the process of the present invention are organofunctional polysiloxanes containing two terminal isocyanate-reactive groups and structural units corresponding to the formula —O—Si(R)$_2$—, in which R is a C$_1$-C$_4$-alkyl radical or a phenyl radical (preferably a methyl radical). Pure polysiloxanes containing terminal organofunctional groups and siloxane polyoxyalkylene copolymers containing terminal organofunctional groups which may be used are known to those skilled in the art. The organopolysiloxanes which are preferred correspond to the general formula:

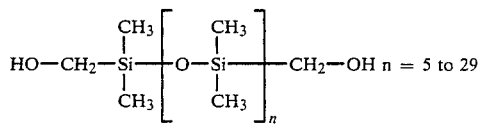

These polysiloxanes may be obtained in known manner by the equilibration of 1,1,3,3-tetramethyl-1,3-hydroxymethyl disiloxane, which corresponds to the formula:

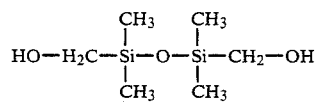

with octamethyl cyclotetrasiloxane in the presence of sulfuric acid or by the process described in DE-B No. 1,236,505.

The NCO-prepolymers containing free aromatically bound isocyanate groups are produced in known manner by reacting the appropriate reactants either in the melt or in solution. In either case, the equivalent ratio of NCO-groups to active hydrogen atoms (preferably OH-groups) is greater than 1 and, generally between 1.5:1 and 2.8:1. It is of course possible to use an even larger excess of polyisocyanate. The NCO-prepolymers ("NCO-preadducts") generally have an oily to wax-like consistency, depending upon the starting components used. If the NCO/OH-ratio is more than 2, primarily non-extended NCO-preadducts are obtained, whereas NCO/OH-ratios below 2 result in increased average molecular weight of the NCO-preadducts. When low molecular weight polyols are used as chain-extending agents in addition to relatively high molecular weight starting compounds in the production of the NCO-prepolymers, relatively high molecular weight NCO-preadducts are obtained.

If the NCO-prepolymers are subjected to distillation (advantageously using a thin-layer evaporator), the monomeric polyisocyanates are removed so that products containing very little, if any, monomeric diamine are obtained in the process of the present invention.

NCO-prepolymers produced from relatively high molecular weight polyols (molecular weight 400 to 12,000), preferably polyether polyols, optionally using chain-extending agents (molecular weight 62 to 399) by reaction with aromatic diisocyanates in an equivalent ratio of from 1:1.5 to 1:2.8 (most preferably from about 1:1.5 to 1:2) are preferred for the process of the present invention.

The NCO-prepolymers used as starting materials have an NCO-content of from 0.5 to 30 wt %, preferably from 1.2 to 25 wt % and, most preferably, from 1.5 to 10 wt %.

So-called "semiprepolymers" (i.e., mixtures of NCO-prepolymers with other free polyisocyanates) which may have an even higher NCO-content, for example up to 40 wt % may also be used in the process of the present invention. For practical and economic reasons, however, this is not advisable in most cases. The monomeric amines formed from the monomeric polyisocyanates can be troublesome in a number of applications.

The compound(s) containing free NCO-groups in the form of modified isocyanates (generally free from urethane groups) or in the form of their NCO-prepolymers (containing urethane groups) or their "semiprepolymers" used as the starting material in the present invention have a total NCO-group content of from 0.5 to 40 wt %, preferably from 1.2 to 25 wt % and, most preferably, from 1.5 to 20 wt %.

The quantity of water used in the process of the present invention should be at least 1 mole of water (2 equivalents) per equivalent of NCO-group in the hydrolysis of the NCO-compound(a). The quantity of water used is preferably ≧5 times (and most preferably ≧10 times) the stoichiometric quantity. In general, the water is used in a quantity of more than 1 part per 100 parts of NCO-compound(a).

The catalysts which are suitable for the process of the present invention are alkali carbonates or hydrogen carbonates such as sodium or potassium carbonate or sodium or potassium hydrogen carbonate; alkali and alkaline earth metal salts of carboxylic acids, optionally in the form of their complexes with acyclic, mono-, di- or polycyclic crown ethers and cryptands, and phase transfer catalysts of the complex cation type. The following compounds are examples of cyclic and open chain crown ether compounds and cryptands: (1,13-bis-8-quinolyl)pentaoxatridecane; 4,7,13,18-tetraoxa-1,10-diazabicyclo-(8,5,5)-eicosane; 4,7,13,16,21-pentaoxa-1,10-diazabicyclo-(8,8,5)-tricosane; 4,7,13,16,21,24-hexaoxa- 1,10-diazabicyclo-(8,8,8)-hexacosane; 5,6-benzo-4,7,13,16,21,24-hexaoxa-1,10-diazabicyclo-(8,8,8)-hexacosane; 1,4,7,10,13,16-hexaoxacyclooctadecane, and 2,5,8,11,14,17-hexaoxaoctadecane. Such compounds are known to those in the art and are described, for example in a Merck Company brochure entitled "Kontakte 1/77", pages 29 et seq. and by J. M. Lehn, Struct. Bond 11, 1 (1973); J. Am. Chem. Soc. 97, 5022 (1975) and 98, 6403 (1976).

Soluble catalysts are preferred, although it does not generally matter if, for example, alkali carbonates or hydrogen carbonates are only partly dissolved in the quantity of water available because adequate quantities of catalysts are present in dissolved form. The undissolved fractions promote smooth filtration of the products.

The alkali salts of mono- and polycarboxylic acids are preferably used as the alkali and alkaline earth metal salts of carboxylic acids. The acid strength of the carboxylic acids should not exceed a $k_a$-value of $10^{-3.5}$. It is particularly preferred to use the alkali metal salts of aliphatic or cycloaliphatic monocarboxylic acids containing up to 10 carbon atoms, such as sodium or potassium acetate, propionate, butyrate, valerate, hexanoate, octanoate, decanoate, or the alkali salt of cyclohexane carboxylic acid. The higher carboxylic acid salts are also catalytically active, but occasionally give rise to difficulties due to their soap-like effect. Calcium acetate and magnesium acetate are also appropriate catalysts. The catalysts may also be used in admixture.

The quantity of catalyst used is preferably between 1 and 200 g, more preferably between 2 and 50 g and, most preferably, between 5 and 30 g of catalyst per equivalent of NCO-group in the isocyanate starting material. Generally quantities of 0,01 to 25 wt-% (referring to isocyanate compound (a)) of the catalysts can be applied in the process.

The water-soluble/water-miscible solvents which may be used in the present invention are solvents based on ethers (preferably dioxane and tetrahydrofuran), the ethers of ethylene glycol or propylene glycol and those containing carboxylic acid dialkyl amide groups and other groups.

More specifically, suitable solvents include water-soluble, aliphatic or cycloaliphatic acid amides containing from 1 to 10 carbon atoms such as dimethyl formamide, diethyl formamide, N-methyl pyrrolidone, dimethyl acetamide, caprolactam, formamide, preferably dimethyl formamide, dimethyl acetamide and N-methyl pyrrolidone. Water-soluble ethers of ethylene glycol or propylene glycol and the cyclic ethers tetrahydrofuran and 1,4-dioxane are also appropriate. Water-soluble, tetra-alkylated aliphatic ureas containing from 4 to 12 carbon atoms (for example tetramethyl ureas or tetraethyl urea), water-soluble, aliphatic or cycloaliphatic sulfones or sulfoxides containing from 2 to 10 carbon atoms (e.g., tetramethylene sulfone or dimethyl sulfoxide), water-soluble, aliphatic or cycloaliphatic phosphoric acid amides (e.g., hexamethyl phosphoric acid triamide), acetonitrile, and water-soluble ketones (such as acetone) may also be used as solvents.

The solvent may also be a mixture in any ratio of the above-described solvents. It is preferred to use solvents which boil at temperatures in the range from 56° to 250° C., preferably from 64° to 165° C. under normal pressure, because this simplifies the process.

Preferred water-miscible solvents are dimethyl formamide, dimethyl acetamide and N-methyl pyrrolidone, tetramethylene sulfone, acetonitrile, acetone, 1,4-dioxane and tetrahydrofuran. Technically, dimethyl formamide, acetonitrile and dioxane are particularly suitable and readily obtainable. It is less preferred to use the Zerewitinoff-active substances, such as caprolactam, formamide, tertiary-butanol, or substances which are not completely unreactive to amino groups (such as acetone) although acceptable products are obtained even if they are used.

Solvents which are not completely miscible with water, such as propionitrile, methyl ethyl ketone, ethyl acetate and hydrocarbons, may be used in small quantities, although there is no advantage in doing so.

In the process of the present invention, at least 10, preferably ≧20 and most preferably, ≧40 parts of water-miscible solvent should be used per 100 parts of NCO-compound in the hydrolysis reaction mixture. The water and, optionally, the water-miscible solvent should be used in such a quantity that a substantially homogeneous (at most slightly clouded) or, preferably, a completely homogeneous, clear solution containing the NCO-compound is formed at the reaction temperature.

The catalytically active compounds are generally added to the solvent and water. Addition to the compounds containing isocyanate groups is possible, but not recommended.

To hydrolyze the NCO-compound to form polyamines having a sufficiently high amine number (i.e., achieve a high conversion rate), it is desirable to maintain a concentration of the NCO-compound in the reaction mixture of ≦66 wt %. The higher the degree of dilution during the hydrolysis reaction, the higher is the conversion of NCO-groups into $NH_2$ groups. In practice, the degree of dilution is limited by economic considerations. In practice, this limit is approximately 3%. However, the solvent should be used in at least an amount such that a substantially homogeneous and preferably completely homogeneous reaction mixture remains.

In a less preferred embodiment, compounds containing "H-active groups" and two or more hydroxy, amino and/or thiol groups may be added to the reaction mixture. Compounds of this type were described above as synthesis components for the NCO-compounds used in the process of the present invention. Difunctional to tetrafunctional compounds having a molecular weight in the range from 62 to 2000, particularly those containing at least two primary hydroxy groups (for example ethane diol, butane diol, 1,2-propane diol, polyethylene glycols, trimethylol propane or the like) may be used. It is also possible to use compounds containing different "H-active groups" such as aminoethanols.

Compounds containing only one H-active group, for example methanol, ethanol, cyclohexanol, cyclohexyl amine, aniline, asymmetrical dimethyl hydrazine, dimethylaminopropyl amine may be used as monofunctional chain terminators.

Pre-extension can occur as a secondary reaction in the process of the present invention (i.e., isocyanate and already-formed amine react with chain attachment to form ureas). This secondary reaction may be largely suppressed by working in dilute solution, by using the catalysts required in the present invention and by maintaining relatively high reaction temperatures. Although it is desirable that secondary reactions of this nature should take place to the least possible extent, a certain degree of pre-extension is nevertheless acceptable on economic grounds.

The reaction which occurs in the process of the present invention is preferably carried out in a homogeneous phase. A slight excess of water or of the NCO-compound may cause a slight clouding of the reaction mixture because the starting materials are no longer completely dissolved. If the reaction is carried out in a heterogeneous phase (for example by the excessive addition of water with precipitation of the NCO-prepolymer), unsatisfactory products are obtained. The optimal mixing ratios, which depend upon the starting compounds used, may be readily determined by a few preliminary tests.

The reaction of the present invention may be carried out at temperatures in the range from 50° to 165° C. However, temperatures in the range from 80° to 130° C. are preferable because the best volume/time yields with high solubility and minimal extension of the ureas are obtained at temperatures in that range. It is most preferred to carry out the reaction at the boiling point of the mixture which, due to the presence of water, is generally in the range from about 90° to 105° C. In some cases, it may be necessary to carry out the reaction under pressure in order to obtain sufficiently high temperatures.

The onset of the reaction is recognizable by the almost spontaneous elimination of $CO_2$ which is observed at low temperatures, for example 22° C. However, it is considerably more favorable to carry out the reaction at higher temperatures in order to suppress urea formation. It is important to ensure that the reactants are mixed rapidly and very thoroughly to form a homogeneous solution which is generally done by using solvents. Reduction in viscosity also occurs where the higher reaction temperatures are applied. The reaction may be carried out either continuously or in batches.

In one batch-type procedure, the NCO-group-containing compound is introduced into aqueous mixture containing solvents and catalysts. This may be done by means of a dropping funnel or by mechanical injection using a nozzle provided that the injected material is thoroughly distributed by intensive stirring.

In a continuous process according to the present invention which is particularly suitable for large-scale production, the NCO-compound(s) (optionally in the form of a solution) and the aqueous solution (i.e., water, solvent and catalyst) are separately delivered to a common reaction zone, intensively mixed (for example by means of a flow mixer) and reacted, and rapidly discharged from the mixing zone. The components may be metered, for example, by means of graduated dropping funnels or by means of a piston and/or diaphragm metering pump or any other metering unit. In the case of continuous metering, it is preferred to mix, react and discharge the two components from the reaction zone very quickly (in seconds or fractions of a second).

Various additives may be used to facilitate the reaction of the isocyanate groups with the aqueous catalyst-containing solvent phase. For example, one or more standard commercial emulsifiers may be used in quantities of from 0.01 to 1 part by weight to 100 parts of reaction mixture to promote homogenization of the reaction mixture. However, this is not necessary where homogeneous reaction mixtures (dissolved components) are used.

The flow mixers suitable for use in a continuous process are static mixers (which comprise fixed baffles) and dynamic mixers (which comprise moving parts on the rotor/stator principle). They may be either heated or cooled. In the case of static mixers, the necessary mixing energy is generated by the pumps, whereas in the case of dynamic mixers a separate motor drives the rotor. In every case, the conversion of the isocyanate groups to amino groups depends upon the power applied and the shear forces correspondingly generated, i.e. upon the rapid, homogeneous dispersion of the NCO-compound in the reaction medium.

The static mixers used may be mixers comprising simple baffles (e.g., coils) or complicated baffles (e.g., packing mixers) or multichannel mixers. It is also possible to use mixing nozzles or mixing chambers in the HK-machines manufactured by the Hennecke Company (Birlinghoven, Federal Republic of Germany), into which the starting products are injected under high pressure (countercurrent injection). Dynamic mixers suitable for use in the process of the present invention include the flow mixers which operate on the stator-rotor principle in the same way as the known impeller homogenizers. These flow mixers cannot, however, be used for delivery or transporting purposes. The necessary mixing energy amounts to between about 1 and 10 KW per liter of mixer volume, depending on the required degree of dispersion, the type of mixer used and the viscosity of the starting materials.

On completion of mixing, the mixture obtained may be worked up directly into the polyamine or, alternatively, may even be left to react further for a short time of generally less than 5 minutes. Where left to react further, the reaction mixture is preferably refluxed gently under normal pressure in order to separate off all the carbon dioxide formed. However, the reaction mixture may also be heated for longer periods without any disadvantage. However, the reaction mixture is preferably worked up immediately after mixing.

Working up of the reaction mixture may also be carried out continuously or in batches. The reaction mixture is normally worked up by distillation, by extraction, by phase separation or by a combination of these methods. The volatile constituents are distilled off, optionally under reduced pressure. In general, sump temperatures (in the residual polyamine) of from 100° to about 130° C. are maintained towards the end of the concentration-by-evaporation phase. Where a thin-layer evaporator is used, distinctly higher temperatures, for example in the range from 170° to 200° C., may briefly be reached in the residual polyamine.

Extraction processes, optionally after dilution with water, may be carried out using water-insoluble solvents, such as methylene chloride or chlorobenzene. Such extraction is not, however, recommended.

Phase separation of the reaction mixture by cooling occurs in some cases if the hydrolysis has been carried out at relatively high temperatures and in the presence of a relatively large quantity of water at the solubility limit. Phase separation may be completed or actually brought about by the addition of water. The aqueous phase optionally containing solvents and also catalyst is separated off from the polyamine phase. In general, the aqueous phase may be directly re-used. In addition to the polyamine, the polyamine phase may contain residues of the catalyst, a little water and possibly some solvent. These residues may be completely removed by distillation, optionally in vacuo, or by thin-layer distillation. If salts are still present in the polyamine, they may be removed by filtration (e.g., using a pressure filter).

If the NCO-group-containing compound still contains free (i.e., monomeric) isocyanate, the monomeric amine formed therefrom may accumulate to a considerable extent in the water/solvent phase during working up by phase separation. In that case, the polyamine obtained by this simple working-up procedure is substantially free from monomer. However, it is preferable to remove monomeric amine from the aqueous solution before reusing that aqueous solution.

The polyamines obtained by the process of the present invention after the working-up operation are generally colorless to faintly colored, medium- to high-viscosity, optionally having relatively high melting points with from 0.19 to 20.3 wt % $NH_2$ groups. Depending upon the particular starting materials, the product polyamines may contain urethane and/or urea and/or uretdione and/or isocyanurate and/or biuret groups and, optionally, ether and/or acetal and/or carbonate and/or ester and/or thioether and/or dialkyl siloxane groups and/or residues of polybutadienes which were present in the NCO-compounds initially. However, additional bonds can be formed by secondary reactions, for example urea groups can be formed from already hydrolyzed fractions and residual NCO-groups during the hydrolysis reaction. The quantity of primary aromatic amino groups present in the polyamines corresponds at most to the quantity of NCO-groups in the NCO-starting material, i.e. approximately 0.19 to 20.3 wt % $NH_2$, preferably 0.46 to 11.3 wt % $NH_2$ and, most preferably, 0.58 to 6.7 wt % $NH_2$.

NCO-groups attached to aliphatic radicals give highly reactive aliphatic amines as hydrolysis products. These aliphatic amines react very quickly with NCO-groups still present to form urea compounds and hence generally give relatively high molecular weight polyurea amines having in many cases a low $NH_2$-content.

By virtue of their low vapor pressure, the polyamines obtained in accordance with the invention are preferably used as reactants for polyisocyanates and blocked polyisocyanates in the production of polyurethanes (polyurethane ureas) and optionally cellular polyurethane plastics or polyurethane foams. These polyamines may even be combined with other low molecular weight (molecular weight 32 to 399) and/or relatively high molecular weight (molecular weight 400 to approximately 12,000) compounds containing isocyanate-reactive groups. Suitable starting components for the production of polyurethane plastics are described above in connection with the production of the prepolymers and also in DE-A Nos. 2,302,564 and 2,432,764 (U.S. Pat. No. 3,903,679) and in DE-A Nos. 2,639,083; 2,512,385; 2,513,815; 2,550,796; 2,550,797; 2,550,833; 2,550,860 and 2,550,862. These publications also contain references to auxiliaries and additives of the type which may optionally be used in the production of polyurethanes.

The present invention also relates to the production of polyurethanes (ureas) using the polyamines produced in accordance with the invention. Such polyurethanes (ureas) may be used for elastomers, coatings, filaments spun from melts, solutions, dispersions or as a mixture of reactive components.

The polyamines produced in accordance with the invention may also be used as coupling components for diazo dyes, as hardeners for epoxide and phenolic resins and in any other known reactions involving amines, such as amide or imide formation or others.

The process of the present invention is illustrated by the following Examples. Unless otherwise indicated, all the quantities are expressed as parts by weight or percentages by weight.

EXAMPLES

Example 1

(Comparison Example)

500 g of an NCO-prepolymer having an NCO content of 3.8% (0.45 mole NCO) were added over a period of 35 minutes to a mixture heated to 90° C. of 1500 ml of dimethyl formamide and 350 ml of water. The NCO-prepolymer had been produced from a polypropylene glycol ether (OH number 56) and 2,4-diisocyanatotoluene in a molar ratio of 1:2 by combining the two components and then heating them for 4 hours to 80° C. 4.1 liters of $CO_2$ escaped during the addition. Immediately after addition of the NCO-prepolymer, the reaction solution was free from NCO. The reaction mixture which was only one phase at the reaction temperature separated into two phases on cooling to 20° C. The upper aqueous DMF-phase (1400 ml) was discarded. The lower phase was freed from residues of volatile constituents for 3 hours at 100° C./20 mbar and then for 3 hours at 100° C./15 mbar. For data, see Table 1.

Comparison Example 1a 500 g of the NCO-prepolymer of Example 1 (heated to 60° C.) were added over a period of 45 minutes to a mixture of 500 ml of water, 88.5 g of potassium carbonate (anhydrous) and 0.5 g of Mersolat ®H (emulsifier) externally cooled to 18°-20° C. There were signs of a reaction during the dropwise addition. When stirred at the temperature of 18°-20° C., the reaction mixture underwent a gradual increase in viscosity which could be accelerated by increasing the temperature. The product obtained was insoluble in dimethyl formamide and substantially free from amino groups.

Comparison Example 1a illustrates a conventional process. It can be seen from this Example that reaction with an externally cooled solution yielded un-useable products.

Comparison Example 1b (Prior Art)

700 ml of water were heated to 90° C. 200 g of the NCO-prepolymer of Example 1 were added to the water over a period of 15 minutes, followed by stirring for 30 minutes at the temperature of 90° C. After the water had been distilled off under reduced pressure, a product insoluble in hot dimethyl formamide and in dilute sulfuric acid was obtained.

This Example shows that, even at high temperatures (90° C.), no useful products were obtained when the catalysts required in the present invention were not present.

Comparison Example 1c (Prior Art)

A mixture of 500 g of water and 21.7 g of sodium hydroxide was heated to 90° C. 500 g of the NCO-prepolymer described in Example 1 were then added over a period of 15 minutes, followed by stirring for 30 minutes. The product which formed at this stage was already gelatinous, crosslinked and insoluble in hot dimethyl formamide.

This Example also shows that un-useable products were obtained by hydrolysis in the presence of the known catalysts (alkali hydroxides) at elevated temperatures (90° C.).

Example 2

500 g of the NCO-prepolymer of Example 1 heated to 20° C. were added over a period of 30 minutes to a mixture heated to 90° C. This mixture was made up of 1500 ml of dimethyl formamide, 250 ml of water and 5 g of potassium acetate and was in the form of a clear solution. 7.5 liters of carbon dioxide were given off and the reaction solution was free from NCO immediately after addition of the NCO-prepolymer. The aqueous DMF-phase formed after cooling was separated off from the organic, lower phase and discarded. The organic phase was freed from residual solvent at 100° C./20 mbar and then at 100° C./0.5 mbar. The amine end product was freed from traces of potassium acetate by filtration. For data, see Table 1.

Example 3

500 g of the NCO-prepolymer of Example 1 heated to 20° C. were added over a period of 30 minutes to a mixture heated to 90° C. This mixture was made up of 1500 ml of dimethyl formamide, 250 ml of water and 15 g of potassium acetate and was in the form of a clear, single-phase solution. 7.9 liters of carbon dioxide were given off and the reaction mixture was free from NCO groups immediately after addition of the NCO-prepolymer. The still hot reaction mixture separated into two phases and was completely filtered off from the potassium acetate precipitated (approximately 1.8 g). Salt was removed from the upper phase ($H_2O$, DMF) by distillation, leaving behind 12.7 g of potassium acetate. Residual solvent was removed from the lower, amine phase at 100° C./20 mbar and then at 100° C./0.5 mbar. The amine end product, which had a temperature of 40° C. was then separated from traces of salt by filtration. For data, see Table 1.

Example 4

500 g of an NCO-prepolymer (NCO-content 4.0%) heated to 20° C. were added over a period of 30 minutes to a mixture heated to 90° C. This mixture was made up of 1500 ml of dimethyl formamide, 250 ml of water and 20 g of potassium acetate which were not completely dissolved. This NCO-prepolymer had been produced from the same components as the prepolymer described in Example 1. 7 liters of carbon dioxide were given off. The solution was filtered off from the undissolved salt and the aqueous DMF-phase formed (1440 ml) was discarded. The amine phase was treated in the same way as that of Example 3. For data, see Table 1.

Example 5

The procedure was the same as in Example 4, except that 28 g of potassium acetate were used. The reaction mixture was worked up in the same way as in Example 4. For data, see Table 1.

TABLE 1

|  | Examples | | | | |
|---|---|---|---|---|---|
|  | 1 (Comp.) | 2 | 3 | 4 | 5 |
| Yield (%) | 96 | 94 | 96 | 96 | 91 |
| Primary nitrogen (%)[1] | 0.49 | 0.76 | 0.87 | 0.96 | 0.95 |
| Total nitrogen (%)[2] | 2.43 | 2.46 | 2.48 | 2.45 | 2.51 |
| NH—number (mg of KOH/g)[3] | 19.6 | 30.4 | 34.8 | 38.4 | 38.0 |
| NH—number (mg of KOH/g)[4] | 19.1 | 31.1 | 35.1 | 38.4 | 38.1 |
| Water content (%)[5] | 0.08 | 0.1 | 0.08 | 0.07 | 0.06 |
| Viscosity (mPa · s/75° C.) | 4800 | 710 | 490 | 450 | 473 |

[1]Titration with perchloric acid
[2]According to Dumas
[3]Calculated from 1
[4]Determined by the acetanhydride method
[5]According to Karl Fischer Examples 6–10

These examples illustrate the effects of potassium hydrogen carbonate as a base when used in different quantities.

Example 6

500 g of the NCO-prepolymer described in Example 1 heated to 60° C. were added over a period of 30 minutes to a mixture heated to 90° C. This mixture was made up of 1500 ml of dimethyl formamide, 250 ml of water and 5 g of potassium hydrogen carbonate and was in the form of a clear, single-phase solution. 6.7 liters of carbon dioxide were given off. After the NCO-prepolymer had been added, the dimethyl formamide/water mixture was immediately distilled off first at 100° C./20 mbar and then at 100° C./1 mbar. Finally, the amine end product was filtered off under suction from the potassium hydrogen carbonate salt. For data, see Table 2.

Example 7

The procedure was the same as in Example 6, except that 10 g of potassium hydrogen carbonate were used and 6.9 liters of carbon dioxide were given off. For data, see Table 2.

Example 8

The procedure was the same as in Example 6, except that 20 g of potassium hydrogen carbonate were used and 7.3 liters of $CO_2$ were given off. For data, see Table 2.

Example 9

The procedure was the same as in Example 6, except that 28.6 g of potassium hydrogen carbon were used and 7.3 liters $CO_2$ were given off. For data, see Table 2.

Example 10

A mixture of 750 ml of dimethyl formamide, 250 ml of water and 28.6 g of potassium hydrogen carbonate was heated to 90° C. 500 g of the NCO-prepolymer of Example 1 heated to 60° C. were added over a period of 30 minutes. 7.8 liters of carbon dioxide were given off. After the NCO-prepolymer had been added, dimethyl formamide and water were separated off by distillation first at 100° C./20 mbar and then at 100° C./1 mbar. The potassium hydrogen carbonate was filtered off under suction from the remaining amine product. For data, see Table 2.

TABLE 2

|  | Examples | | | | |
| --- | --- | --- | --- | --- | --- |
|  | 6 | 7 | 8 | 9 | 10 |
| Yield (%) | 99 | 99 | 99 | 98 | 99 |
| Primary nitrogen (%)[1] | 0.88 | 0.94 | 0.99 | 1.02 | 0.99 |
| Total nitrogen (%)[2] | 2.49 | 2.53 | 2.46 | 2.50 | 2.50 |
| NH—number (mg of KOH/g)[3] | 35.2 | 37.6 | 39.6 | 40.8 | 39.6 |
| NH—number (mg of KOH/g)[4] | 35.4 | 37.1 | 40.2 | 41.4 | 38.9 |
| Water content (%)[5] | 0.12 | 0.10 | 0.10 | 0.32 | 0.07 |
| Viscosity (mPa · s/75° C.) | 520 | 433 | 410 | 390 | 384 |

[1–5]see Table 1.

Examples 11–20

Other inorganic catalysts suitable for use in accordance with the invention are shown in Examples 11 to 20.

Example 11

500 g of the NCO-prepolymer described in Example 1 were added over a period of 15 minutes to a refluxed mixture of 1500 ml of dimethyl formamide, 200 g of water and 10 g of potassium carbonate. 6.6 liters of $CO_2$ were given off during the reaction. Immediately after the addition, the intensively stirred reaction mixture was free from NCO. On cooling to room temperature, the reaction mixture which had been only one liquid phase at the reaction temperature separated into two phases. The upper aqueous DMF-phase (1360 ml) was separated off and discarded. The lower phase was freed from residue volatile constituents first for 2 hours at 100° C./20 mbar and then for 2 hours at 100° C./1.5 mbar. Subsequently, minor traces of salt (potash) were removed at 100° C. by filtration using a pressure filter heated to 100° C. For data, see Table 3.

Example 12

The procedure was the same as in Example 11, except that 50 g of potassium carbonate were used as base. 6.5 liters of $CO_2$ escaped during the reaction. The reaction mixture was worked up in the same way as that of Example 11. For data, see Table 3.

Example 13

500 g of the NCO-prepolymer described in Example 1 were added over a period of 60 minutes to a mixture heated to 85° C. of 1500 ml of dimethyl formamide, 300 ml of water and 10 g of sodium carbonate. 6.6 liters of carbon dioxide were given off during the reaction. Immediately after the addition, the reaction mixture which was only one phase was free from NCO. The reaction mixture was intensively stirred during addition of the NCO-component. On cooling to 20° C., the reaction mixture separated into two phases. The upper, aqueous DMF-phase was separated off and discarded. The lower phase was worked up in the same way as that of Example 11. For data, see Table 3.

Example 14

The procedure was the same as in Example 13, except that, after addition of the NCO-component, the reaction mixture was not subjected to phase separation, but instead was distilled under reduced pressure. Thereafter traces of volatile constituents were removed at 100° C./0.2 mbar and the salt (soda) was removed by filtration using a pressure filter. For data, see Table 3.

Example 15

The procedure was the same as in Example 13, except that 50 g of soda were used instead of 10 g. The reaction mixture was worked up in the same way as in Example 13. For data, see Table 3.

Example 16

500 g of the NCO-prepolymer described in Example 1 were added over a period of 90 minutes with intensive stirring to a mixture heated to 60° C. This mixture was made up of 2 liters of dimethyl formamide, 250 ml of water and 10 g of sodium hydrogen carbonate. 8.2 liters of carbon dioxide were given off. After cooling, the upper phase was separated off and was discarded. The reaction product was worked up in the same way as that of Example 1. For data, see Table 3.

Example 17

500 g of the NCO-prepolymer described in Example 1 were added over a period of 30 minutes with intensive stirring to a reflux mixture of 1500 ml of dimethyl formamide, 250 g of water and 5 g of aqueous sodium sulfide. 6.4 liters of $CO_2$ were given off. Immediately after the NCO-component had been added, the reaction mixture was free from NCO. On cooling to 20° C., the reaction mixture which had been only one liquid phase at the reaction temperature, separated into two phases. The upper phase containing water and dimethyl formamide was separated off and discarded. The lower phase was freed from residues of volatile constituents at 100° C./20 mbar and the remaining salt was separated off using a pressure filter (100° C./3 bar). For data, see Table 3.

Example 18

The procedure was the same as in Example 17, except that 30 g of aqueous sodium sulfide were used instead of 10 g. 5.9 liters of carbon dioxide were given off. The reaction mixture was worked up in the same way as that of Example 17. For data, see Table 3.

Example 19

500 g of the same NCO-prepolymer as was used in Example 1 were added with intensive stirring to a refluxed mixture of 50 g of waterglass (sodium silicate solution 128.4 mMoles of Na), 1.5 liters of dimethyl formamide and 250 g of water. 4.3 liters of $CO_2$ were given off. Immediately after the NCO-prepolymer had been added, the reaction mixture was free from NCO. On cooling to 20° C., the reaction mixture which had been only one liquid phase at the reaction temperature, separated into two liquid phases. The upper, aqueous DMF-phase was separated off and discarded. The lower phase was separated from volatile constituents first at 100° C./20 mbar and then at 100° C./0.2 mbar and then filtered once more through a pressure filter. For data, see Table 3.

Example 20

The procedure was the same as in Example 19, except that the phases were not separated. The entire reaction mixture was subjected to distillation. For data, see Table 3.

tially dissolved at the temperature of 90° C. 7 liters of carbon dioxide were given off. Thereafter the reaction mixture was free from NCO. Phase separation took place very sluggishly and had to be induced and accelerated by the addition of 250 ml of water. The potassium hydrogen carbonate which precipitated was filtered off under suction beforehand. A lower aqueous phase of 700 ml was separated off and discarded. Solvent and residual salts were removed from the upper phase in the same way as in Example 21. For data, see Table 4.

EXAMPLE 23

The procedure was the same as in Example 22, except that tetrahydrofuran was used instead of dioxane. For data, see Table 4.

EXAMPLE 24

Example 22 was repeated using 1,2-dimethoxy ethane instead of dioxane. Once again, phase separation was very sluggish at 20° C. After the addition of 700 ml of water, a lower phase of 1400 ml was separated off. The upper phase was treated in the same way as in Example 22. For data, see Table 4.

EXAMPLE 25

The procedure was the same as in Example 21, except that acetone was used instead of acetonitrile. For data, see Table 4.

EXAMPLE 26

The procedure was the same as in Example 21, except

TABLE 3

| Examples | 11 | 12 | 13 | 14 | 15 | 16 | 17 | 18 | 19 | 20 |
|---|---|---|---|---|---|---|---|---|---|---|
| Yield (%) | 94 | 96 | 94 | 100 | 93 | 94 | 95 | 93 | 0.88 | 0.91 |
| Primary nitrogen (%)[1] | 0.93 | 0.91 | 0.96 | 1.08 | 1.05 | 1.07 | 0.88 | 0.91 | 0.94 | 0.93 |
| Total nitrogen (%)[2] | 2.43 | 2.47 | 2.40 | 2.46 | 2.45 | 2.45 | 2.45 | 2.43 | 2.48 | 2.40 |
| NH—number (mg of KOH/g)[3] | 37.0 | 36.4 | 38.4 | 43.2 | 42.0 | 42.8 | 35.2 | 36.4 | 38.4 | 36.4 |
| NH—number (mg of KOH/g)[4] | 37.8 | 36.4 | 38.9 | 42.9 | 42.1 | 42.4 | 35.0 | 36.4 | 38.4 | 35.9 |
| Water content (%)[5] | 0.25 | 0.12 | 0.41 | 0.20 | 0.20 | <0.05 | 0.41 | 0.34 | 0.12 | 0.17 |
| Viscosity (mPa · s/75° C.) | 445 | 430 | 404 | 384 | 395 | 381 | 496 | 501 | 483 | 520 |

[1]−[5]see Table 1

EXAMPLE 21

500 g of the NCO-prepolymer described in Example 1 heated to 90° C. were added with vigorous stirring over a period of 30 minutes to a refluxed mixture of 1500 ml of acetonitrile, 250 ml of water and 28.6 g of potassium hydrogen carbonate. During the addition, 7 liters of carbon dioxide were given off in a constant stream. The reaction mixture was then free from NCO. The potassium hydrogen carbonate was filtered off under suction from the reaction mixture which was only one phase even at 20° C. The solvents were distilled off first at 20 mbar/80° C. (bath temperature) and then at 0.1 mbar/100° C. Finally, 0.6 g of potassium hydrogen carbonate was filtered off using a glass vacuum filter. For data, see Table 4.

EXAMPLE 22

500 g of the NCO-prepolymer described in Example 1 were added over a period of 45 minutes with intensive stirring to a mixture heated to 90° C. This mixture was made up of 1.5 l of dioxane, 250 ml of water and 28.6 g of potassium hydrogen carbonate which was substanthat methyl ethyl ketone was used instead of acetonitrile. For data, see Table 4.

EXAMPLE 27

(continuous mixing)

Component A: 40 kg of the NCO-prepolymer described in Example 1 (50° C.)
Component B: 120 kg of dimethyl formamide, 20 kg of water and 400 g of potassium acetate (80° C.)

Components A and B were mixed in a continuous mixer of the type described in Example 16 of DE-A No. 3,131,252. Components A and B were mixed in a ratio by weight of 1:3.5 for a period of 30 minutes, during which gas was given off. The resulting mixture was transferred to a vessel in which it was heated for another 30 minutes to 90° C. Water and dimethyl formamide were then distilled off in vacuo (first at 700–100 mbar, then at 0.9 mbar) at 100° C. The salt was separated off from the product which had a temperature of 40° C. by filtration using a pressure filter. For data, see Table 4.

TABLE 4

| Example | 21 | 22 | 23 | 24 | 25 | 26 | 27 |
|---|---|---|---|---|---|---|---|
| Yield (%) | 99 | 76 | 81 | 67 | 80 | 78 | 98 |
| Primary nitrogen (%)[1] | 0.99 | 0.97 | 0.98 | 1.0 | 1.0 | 0.85 | 1.1 |
| Total nitrogen (%)[2] | 2.50 | 2.51 | 2.41 | 2.46 | 2.44 | 2.48 | 2.42 |
| NH—number (mg of KOH/g)[3] | 39.8 | 38.8 | 39.1 | 39.9 | 40.0 | 34.2 | 43.8 |
| NH—number (mg of KOH/g)[4] | 40.3 | 39.1 | 38.7 | 40.0 | 40.1 | 35.3 | 44.5 |
| Water content (%)[5] | 0.08 | 0.05 | 0.31 | 0.25 | 0.14 | 0.27 | 0.05 |
| Viscosity $\eta^{75}$ (mPa·s) | 470 | 483 | 491 | 465 | 430 | 620 | 364 |

[1-5] see Table 1

EXAMPLES 28–35

In these Examples, different NCO-prepolymers and other NCO-compounds were converted into polyamines.

EXAMPLE 28

500 g of an NCO-prepolymer having an NCO-value of 6.6% were added over a period of 30 minutes to a mixture heated to 90° C. This mixture was made up of 1500 ml of dimethyl formamide, 250 ml of water and 49.7 g of potassium hydrogen carbonate, in which most of the $KHCO_3$ was undissolved. 14.3 liters of carbon dioxide were given off. The reaction mixture was free from NCO immediately after the addition. The NCO-prepolymer had been produced from a polytetramethylene glycol ether diol (OH-number 112) and 2,4-diisocyanatotoluene in a molar ratio of from 1:2 by combining the two components at room temperature and then heating them for 4 hours to 80° C. On cooling to 20° C., the reaction mixture which had been only one phase at the reaction temperature separated into two phases. The upper aqueous DMF-phase (1480 ml) was separated off and discarded. The potassium hydrogen carbonate was filtered off hot before phase separation. The lower phase was freed from residues of volatile constituents at 20 mbar/100° C., then at 0.5 mbar/100° C. and then by filtration from residues of salts. For data, see Table 5.

EXAMPLE 29

500 g of an NCO-prepolymer (NCO-content 11.2%) heated to 50° C. were added over a period of 20 minutes to a mixture heated to 90° C. This mixture was made up of 1500 ml of dimethyl formamide, 500 ml of water and 84.3 g of potassium hydrogen carbonate, most of which was undissolved in this mixture. 78 g of $KHCO_3$ were filtered off from the hot reaction mixture and 600 ml of water were added to the cooled reaction mixture (still only one phase), after which phase separation occurred. The upper phase (2200 ml) was separated off and discarded. The lower phase was further treated in the same way as that of Example 28. For data, see Table 5.

The NCO-prepolymer used in Example 29 had been produced from a polypropylene glycol (OH-number 265) and 2,4-diisocyanato-toluene in a molar ratio of 1:2 by combining the two components at room temperature and heating them for four hours to 80° C.

EXAMPLE 30

500 g of an NCO-prepolymer (NCO-content 5.6%) heated to 50° C. were added with intensive stirring over a period of 20 minutes to a mixture heated to 90° C. This mixture was made up of 1500 ml of dimethyl formamide, 400 ml of water and 46 g of potassium hydrogen carbonate, most of which was undissolved in this mixture. Carbon dioxide was given off during the addition. The NCO-prepolymer had been produced from a polypropylene glycol (OH-number 112) and an approximately 1:1-mixture of 4,4'-diisocyanatodiphenyl methane and 2,4'-diisocyanatodiphenyl methane in a molar ratio of 1:2 by combining the two components at room temperature and heating them for four hours to 80° C. The procedure was otherwise the same as in Example 28. For data, see Table 5.

EXAMPLE 31

600 g of an NCO-prepolymer (NCO-content 3.2%) were added over a period of 20 minutes with intensive stirring to a mixture heated to 90° C. This mixture was made up of 1500 ml of dimethyl formamide, 200 ml of water and 20 g of potassium hydrogen carbonate, most of which was undissolved in this mixture. $CO_2$ was continuously given off during the addition. The NCO-prepolymer had been produced from a polypropylene glycol (OH-number 56) and an approximately 1:1-mixture of 4,4'-diisocyanatodiphenyl methane and 2,4'-diisocyanatodiphenyl methane in a molar ratio (OH:NCO) of 1:2 by combining the two components at room temperature and heating them for four hours to 40° C. The procedure was otherwise the same as in Example 28. For data, see Table 5.

EXAMPLE 32

750 g of an NCO-prepolymer having an NCO-content of 2.0% were added over a period of 10 minutes with intensive stirring to a mixture heated to 85° C. This mixture was made up of 1500 ml of dimethyl formamide, 150 ml of water and 20 g of sodium carbonate, most of which was undissolved in this mixture. Carbon dioxide was given off in a uniform stream during the addition. The NCO-prepolymer had been produced from a 1,2-propyleneglycol-started polyether polyol (OH-number 28) of 80% of polyoxypropylene units and 20% of polyoxyethylene units (terminal) and 2,4-diisocyanatotoluene in a molar ratio of 1:2 by combining the two components at room temperature and heating them for four hours to 80° C. The procedure was otherwise the same as in Example 28. For data, see Table 5.

EXAMPLE 33

500 g of an NCO-prepolymer having an NCO-content of 3.3% were added over a period of 25 minutes with intensive stirring to a refluxed mixture of 1500 ml of dimethyl formamide, 200 ml of water and 30 g of potassium carbonate most of which was undissolved. Carbon dioxide was given off in a uniform stream during the addition. The NCO-prepolymer used had been produced from a polypropylene glycol (OH-number 56) and 2,4'-diisocyanatodiphenyl sulfide in a molar ratio of 1:2 by combining the two components at room temperature and heating them for four hours to 80° C. The procedure was otherwise the same as in Example 28. For data, see Table 5.

EXAMPLE 34

500 g of an NCO-prepolymer having an NCO-content of 1.9% were added over a period of 20 minutes to a mixture heated to 90° C. This mixture was made up of 1500 ml of dimethyl formamide, 150 ml of water and 30 g of sodium hydrogen carbonate, most of which was undissolved in the mixture. Carbon dioxide was given off in a uniform stream during addition of the NCO-prepolymer which was accompanied by intensive stirring. The NCO-prepolymer used had been produced from a polyether triol (OH-number 28) consisting of a trimethylol-propane-started polyoxypropylene block of 83% and a polyoxyethylene block of 17% and 2,4-diisocyanatotoluene in a molar ratio of 1:2 by combining the two components at room temperature and heating them for four hours to 80° C. The procedure was otherwise the same as in Example 28. For data, see Table 5.

EXAMPLE 35

1.4 liters of a solution of 700 g of a trimer of 2,4-diisocyanatotoluene (NCO-content 20.3%, "Desmodur IL" ®, a product of Bayer AG) in 700 ml of dioxane were added over a period of 30 minutes with intensive stirring to a mixture heated to 90° C. This mixture was made up of 1400 ml of dimethyl formamide, 350 ml of water and 39 g of potassium hydrogen carbonate. Carbon dioxide was given off in a vigorous stream. The reaction mixture, which was free from NCO immediately after addition of the NCO-prepolymer, was freed from the potassium hydrogen carbonate by hot filtration. The filtrate (which was only one phase even at 20° C.) was subjected to distillation under reduced pressure. A hard and brittle material which softened above 100° C., was insoluble in ethanol and soluble in DMF was obtained. An IR-spectrum showed strong isocyanurate bands and amine bands. For data, see Table 5.

1,4-butane diol 1:1) and 2,4-diisocyanatotoluene in a molar ratio of 1:2 by the addition of liquid polyester to polyisocyanate heated to 80° C., followed by heating for 3 hours at 80° C. The potassium hydrogen carbonate was filtered off from the reaction mixture after cooling to 20° C. No phase separation occurred. The single-phase filtrate was freed from solvent under reduced pressure and filtered once again. For data, see Table 6.

EXAMPLE 37

1.5 kg of a mixture of an NCO-prepolymer (NCO-content 3.4%) and 500 g of dioxane were added with intensive stirring to a mixture heated to 90° C. This heated mixture was made up of 2.5 l of dimethyl formamide, 500 ml of water and 56 g of potassium hydrogen carbonate which was not completely dissolved. Carbon dioxide was given off. The NCO-prepolymer had been produced in the same way as that described in Example 38 from the polyester of Example 36 and diisocyanate of Example 38 in a molar ratio of 1:2. The NCO-free reaction mixture was worked up in the same way as in Example 36. For data, see Table 6.

EXAMPLE 38

500 g of an NCO-prepolymer heated to 70° C. were added over a period of 60 minutes with intensive stirring to a mixture heated to 90° C. This mixture was made up of 1.5 l of dimethyl formamide, 250 ml of water and 28 g of potassium hydrogen carbonate which was not completely dissolved. Carbon dioxide was given off. The NCO-prepolymer, which had an NCO-content of 3.8%, had been produced by heating the polyester of adipic acid, ethylene glycol and 1,4-butane diol (molar ratio of ethylene glycol to 1,4-butane diol 4:7), OH-number 56, for four hours to 80° C. with a molar excess of a mixture of 65% of 2,4-diisocyanatotoluene and 35% of 2,6-diisocyanatotoluene, followed by removal of the excess diisocyanate by distillation using a so-called thin-layer evaporator. The reaction mixture was worked up in the same way as in Example 36. For data, see Table 6.

TABLE 5

| Example | 28 | 29 | 30 | 31 | 32 | 33 | 34 | 35 |
|---|---|---|---|---|---|---|---|---|
| Yield (%) | 97 | 86 | 94 | 94 | 93 | 95 | 91 | 99 |
| Primary nitrogen (%)[1] | 1.110 | 2.32 | 1.45 | 1.0 | 0.45 | 0.94 | 0.41 | 7.04 |
| Total nitrogen (%)[2] | 4.41 | 8.14 | 3.80 | 2.58 | 1.36 | 2.34 | 1.29 | 16.0 |
| NH—number (mg of KOH/g)[3] | 46.4 | 92.8 | 58.0 | 40.0 | 18.0 | 37.8 | 16.4 | 28.2 |
| NH—number (mg of KOH/g)[4] | 46.4 | 93.1 | 61.0 | 39.3 | 19.3 | 36.7 | 16.3 | 28.6 |
| Water content (%)[5] | 0.41 | 0.26 | 0.14 | 0.17 | 0.06 | 0.17 | 0.23 | 0.4 |
| Viscosity (mPa · s/75° C.) | 1900 | 17500 | 912 | 396 | 320 | 283 | 398 | —[6] |

[1-5]See Table 1
[6]resin

In Examples 2 to 35, NCO-prepolymers of anionic polyisocyanates and polyether polyols and an NCO-adduct of aromatic polyisocyanates were converted into the corresponding amines. In Examples 36 to 40, prepolymers of polyester polyols and aromatic polyisocyanates were converted into amine.

EXAMPLE 36

900 g of an NCO-prepolymer (NCO-content 3.0%) heated to 50° C. were added over a period of 45 minutes with intensive stirring to a mixture heated to 90° C. This mixture was made up of 2.7 kg of dimethyl formamide, 450 ml of water and 50 g of potassium hydrogen carbonate which was not completely dissolved. Carbon dioxide was given off. The NCO-prepolymer had been produced from a polyester of adipic acid, ethylene glycol and 1,4-butane diol (molar ratio of ethylene glycol to

6.

EXAMPLE 39

The procedure was the same as in Example 36, except that, after the NCO-prepolymer had been added, the mixture was filtered and cooled to 20° C. Phase separation occurred on the addition of 150 ml of water. The upper phase (1470 ml) was separated off and discarded. The lower phase was freed from the solvent by distillation at 100° C./20 mbar and 100° C./1 mbar and then filtered once again while still hot. The product was solid at room temperature. For data, see Table 6.

EXAMPLE 40

1.2 kg of a mixture of 1 kg of an NCO-prepolymer (NCO-content 3.3%) and 200 g of dioxane were added over a period of 60 minutes with intensive stirring to a mixture heated to 80° C. of 3 l of dimethyl formamide, 500 ml of water and 56 g of potassium hydrogen carbonate (partly undissolved). Carbon dioxide was given off. The NCO-prepolymer had been produced by reacting a polyester of adipic acid, trimethylol propane and diethylene glycol (OH-number 50, functionality~2.5) and 2,4-diisocyanatotoluene in a molar ratio of 1:2, the components combined at 20° C., subsequently heated to 80° C. and kept at that temperature for four hours. Further working up was carried out in the same way as described in Example 36. For data, see Table 6.

TABLE 6

| Example | 36 | 37 | 38 | 39 | 40 |
|---|---|---|---|---|---|
| Yield (%) | 98 | 97 | 99 | 82 | 98 |
| Primary nitrogen (%)[1] | 0.91 | 0.76 | 1.03 | 0.85 | 0.98 |
| Total nitrogen (%)[2] | 2.55 | 2.34 | 2.41 | 2.36 | 2.65 |
| NH—number (mg of KOH/g)[3] | 36.4 | 30.4 | 41.1 | 33.9 | 39.2 |
| NH—number (mg of KOH/g)[4] | 37.4 | 32.7 | 40.1 | 33.4 | 36.7 |
| Water content (%)[5] | >0.05 | 0.16 | 0.18 | 0.12 | 0.28 |
| Viscosity[6] | — | — | — | — | — |

[1]-[5]See Table 1.
[6]All the polyester amines of Examples 36 to 40 were extremely viscous or solid compounds (at room temperature).

In Examples 41–46, the aliphatic amines were produced from prepolymers of aliphatic polyisocyanates and polyether polyols and from NCO-adducts of aliphatic polyisocyanates.

EXAMPLE 41

500 g of a thin-layered NCO-prepolymer of 1,6-diisocyanatohexane and dipropylene glycol having an NCO-content of 14.0% were added over a period of 60 minutes with intensive stirring to a mixture heated to 90° C. This mixture was made up of 1500 ml of dimethyl formamide, 500 ml of water and 110 g of potassium acetate. The reaction mixture which was free from NCO immediately after the addition was cooled to 20° C. and filtered to separate off the salt. After removal of the solvent by distillation at 100° C./20 mbar and 100° C./1 mbar, the mixture was filtered once again. For data, see Table 7.

EXAMPLE 42

500 g of a thin-layered NCO-prepolymer (NCO-content 5.0%) of 1,6-diisocyanatohexane and polypropylene glycol (OH-number 112) were added over a period of 45 minutes with intensive stirring to a mixture heated to 90° C. This mixture was made up of 1500 ml of dimethyl formamide, 200 g of water and 50 g of potassium carbonate. Working up was carried out in the same way as in Example 41. For data, see Table 7.

EXAMPLE 43

500 g of a thin-layered NCO-prepolymer (NCO-content 2.0%) of isophorone diisocyanate and a polyether triol in the form of a glycerol-started polyoxypropylene triol having an OH-number of 35, were added over a period of 30 minutes with intensive stirring to a mixture heated to 90° C. This mixture was made up of 1500 ml of dimethyl formamide, 150 g of water and 30 g of potassium hydrogen carbonate. Working up was carried out in the same way as in Example 41. For data, see Table 7.

EXAMPLE 44

500 g of a 1,6-diisocyanatohexane biuret (NCO-content 21.3%) were added over a period of 60 minutes with intensive stirring to a mixture heated to 80° C. This mixture was made up of 1500 ml of dimethyl formamide, 550 g of water and 100 g of potassium hydrogen carbonate. Working up was carried out in the same way as in Example 41. For data, see Table 7.

EXAMPLE 45

500 g of an adduct (NCO-content 18.7%) which had been obtained by the trimerization of 1,6-diisocyanatohexane and heated to 50° C. were added over a period of 60 minutes with intensive stirring to a mixture heated to 90° C. This mixture was made up of 1500 ml of dimethyl formamide, 500 g of water and 100 g of potassium hydrogen carbonate. Working up was carried out in the same way as in Example 41. For data, see Table 7.

EXAMPLE 46

500 g of a thin-layered NCO-prepolymer (heated to 60° C.) of 1,6-diisocyanatohexane and trimethylol propane (NCO-content 16.8%) were added over a period of 60 minutes with intensive stirring to a mixture heated to 90° C. This mixture was made up of 1500 ml of dimethyl formamide, 500 g of water and 100 g of sodium hydrogen carbonate. Working up was carried out in the same way as in Example 41. For data, see Table 7.

EXAMPLES 47–51

In these examples 47–51 it is described to add the catalyst to the NCO-prepolymer. The reaotion mixtures are worked up as described in example 47. For data see table 8.

EXAMPLE 47

Into 100 g of NCO-prepolymer according to example 1 a mixture oF 3000 ml of dimethylformamide, 500 ml of water and 56 g of KHCO$_3$ is added within 5 minutes at a temperature of 90° C. and the resultant reaction mixture is kept 5 minutes more at this temperature. During this procedure there are evolved 10,6 liters of CO$_2$-gas, when 400 ml of the mixture are added. When adding more of the mixture, no more CO$_2$ will be evolved.

The undissolved KHCO$_3$ is filtered off, the filtrate is concentrated by distillation and is again filtered to remove some further solid particles of KHCO$_3$.

· EXAMPLE 48

The reaction is conducted as in example 47, but the time of addition of the catalyst solution is doubled (to 10 minutes). After addition of 400 ml DMF/Water/KHCO$_3$-solution about 15,6 l CO$_2$-gas evolved—no more gas evolved on addition of more of the solution.

EXAMPLE 49

To 1 kg of the NCO-prepolymer of example 47 is added at a temperature of 90° C. within 5 minutes a mixture of 440 ml of dimethylformamide, 66,4 g of water and 7,44 g of KHCO$_3$. After stirring for 5 minutes at 90° C. 15.6 l of CO$_2$ evolved.

EXAMPLE 50

To 1 kg of the NCO-prepolymer of example 34 is added at a temperature of 90° C. a 90° C.-hot mixture of 3000 ml of dimethylformamide, 500 ml of water and 56 g of KHCO$_3$. After addition of 400 ml of the mixture the $CO_2$-evolution stops, 10 l $CO_2$ evolved—no further $CO_2$ evolved when adding more of the mixture.

EXAMPLE 51

Into a 90° C. hot NCO-prepolymer according to example 47 a mixture of 2000 ml of dimethylformamide, 333 g of water and 37,6 g of $KHCO_3$ is introduced within 5 minutes. 9,6 l of $CO_2$-gas were evolved.

TABLE 7

| Example | 41 | 42 | 43 | 44 | 45 | 46 |
|---|---|---|---|---|---|---|
| Yield (%) | 99 | 99 | 98 | 73 | 75 | 57 |
| Primary nitrogen (%)[1] | 4.50 | 1.57 | 0.56 | 6.75 | 3.19 | 4.46 |
| Total nitrogen (%)[2] | 9.99 | 3.41 | 1.45 | 16.4 | 18.7 | 14.0 |
| NH—number (mg of KOH/g)[3] | 180 | 62.8 | 22.4 | 270 | 127.6 | 178.4 |
| NH—number (mg of KOH/g)[4] | 184 | 63.1 | 22.5 | 293 | 131.4 | 181 |
| Water content (%)[5] | 0.53 | 0.05 | 0.11 | 0.14 | 0.24 | 0.25 |
| Viscosity (mPa · s/75° C.) | 630 | 590 | —+ | —+ | —+ | —+ |

[1-5]See Table 1
+not measured, but low viscous polyamines at 25° C.

TABLE 8

| Example | 47 | 48 | 49 | 50 | 51 |
|---|---|---|---|---|---|
| Yield (%) | 98 | 99 | 99 | 99 | 100 |
| Primary nitrogen (%)[1] | 0.87 | 0.64 | 0.64 | 0.47 | 0.81 |
| Total nitrogen (%)[2] | 2,40 | 2,50 | 2.46 | 1.31 | 2.47 |
| NH—number (mg of KOH/g)[3] | 34.6 | 25.7 | 25.6 | 18.8 | 31.9 |
| NH—number (mg of KOH/g)[4] | 33.0 | 26.7 | 26.1 | 18.8 | 31.9 |
| Water content (%)[5] | 0.17 | 0.17 | 0.31 | 0.18 | 0.09 |
| Viscosity (mPa · s/75° C.) | 520 | 930 | 800 | 410 | 683 |

[1-5]See Table 1.

What is claimed is:

1. A single stage process for the production of a polyamine containing primary amino groups comprising hydrolyzing (a) an isocyanate compound having an NCO-content of from 0.5 to 40 wt % with (b) an excess of water in the presence of (c) from 0.01 to 25 wt % of a compound selected from the group of alkali carbonates and hydrogen carbonates, alkali and alkaline earth salts of monocarboxylic and polycarboxylic acids, and mixtures thereof in the presence of (d) a water-miscible polar solvent in a quantity of at least 10 parts by weight solvent for each 100 parts by weight isocyanate compound at a temperature of from 50 to 165° C. in a manner such that (a), (b), (c) and (d) are kept substantially homogeneous during the hydrolysis reaction.

2. The process of claim 1 in which (c) contains from 1 to 10 carbon atoms.

3. The process of claim 1 in which (c) is substantially completely dissolved.

4. The process of claim 1 in which (b) is used in a quantity of at least 2 equivalents for each equivalent of NCO-groups in (a).

5. The process of claim 1 in which (b) is used in a quantity of at least 10 equivalents for each equivalent of NCO-groups in (a).

6. The process of claim 1 in which the water-miscible solvent (d) contains at least one of the following groups: carboxylic acid dialkyl amide, lactam, tetraalkyl urea, sulfone, sulfoxide, phosphoric acid dialkylamide, nitrile, ketone and ether groups and has a boiling point in the range from 56° to 250° C.

7. The process of claim 6 in which the water-miscible solvent is used in a quantity of at least 20 parts by weight solvent for each 100 parts of isocyanate compound (a).

8. The process of claim 1 in which the hydrolysis is conducted at a temperature of from 80° to 130° C.

9. The process of claim 1 in which the isocyanate compound (a) is an NCO-prepolymer based on a relatively high molecular weight difunctional or trifunctional polyether, polyester, polycarbonate and/or polycaprolactone polyol having from 1.5 to 15 wt % aromatically-bound NCO-groups.

10. The process of claim 1 in which the hydrolysis reaction is carried out on a continuous basis.

11. A polyamine containing from 0.19 to 20.3 wt % $NH_2$-groups which polyamine is produced by hydrolyzing
   (a) a compound having an NCO-content of from 0.5 to 40 wt % with
   (b) an excess of water,
   (c) from 0.01 to 25 wt % of at least one of the following compounds: alkali carbonates and hydrogen carbonates, alkali and alkaline earth salts of monocarboxylic and polycarboxylic acids in the presence of
   (d) a water-miscible polar solvent in a quantity of at least 10 parts by weight solvent for each 100 parts by weight isocyanate compound (a)
at a temperature of from 50° to 165° C. in a manner such that (a), (b), (c) and (d) are kept substantially homogeneous during the hydrolysis reaction.

12. The polyamine of claim 11 in which the NCO-compound (a) is an NCO-prepolymer based on a relatively high molecular weight difunctional or trifunctional polyol having from 1.5 to 15 wt % aromatically-bound NCO-groups.

13. The polyamine of claim 12 in which the NCO-prepolymer is based on a polyether, polyester, polycarbonate and/or polycaprolactone polyol.

14. The polyamine of claim 11 containing from 0.46 to 11.3 wt % $NH_2$-groups.

15. The polyamine of claim 11 containing from 0.58 to 6.7 wt % NH2-groups.

* * * * *